United States Patent [19]
Welles

[11] Patent Number: 5,934,738
[45] Date of Patent: Aug. 10, 1999

[54] COLLAPSIBLE ROOM ADDITION FOR A CAMPER

[76] Inventor: James F. Welles, 531 N. Ocean Blvd., #903, Pompano Beach, Fla. 33062

[21] Appl. No.: 09/034,426

[22] Filed: Mar. 4, 1998

[51] Int. Cl.⁶ ..................................................... B60P 3/39
[52] U.S. Cl. ........................................ 296/165; 296/26.01
[58] Field of Search ............................ 296/26.01, 26.04, 296/26.08, 26.11, 164, 165, 166, 168, 173, 172

[56] References Cited

U.S. PATENT DOCUMENTS

| 3,511,529 | 5/1970 | Cutsinger | 296/164 |
| 3,547,480 | 12/1970 | Ward | 296/164 |
| 3,622,193 | 11/1971 | Schmidt | 296/164 |
| 3,770,297 | 11/1973 | Quick | 296/164 X |
| 4,085,959 | 4/1978 | Dimick | 296/26.01 X |
| 4,222,604 | 9/1980 | Human | 296/265 |
| 4,542,933 | 9/1985 | Bischoff | 296/164 |

Primary Examiner—D. Glenn Dayoan
Assistant Examiner—Chad D Wells
Attorney, Agent, or Firm—Robert M. Downey, P.A.

[57] ABSTRACT

A collapsible room addition is provided for use on the front of a camper under the nose area. The rigid panel members of the room are foldably attached and stowed underneath the camper nose. When the panel members are unfolded, front, interior, rear and side walls of the room are provided along with floor members which form a weathertight and secure room. An alternative embodiment is provided wherein the walls are formed of a curtain or other flexible material hung down to approximately ground level along the periphery of the lower, outer edge of the nose area.

2 Claims, 2 Drawing Sheets

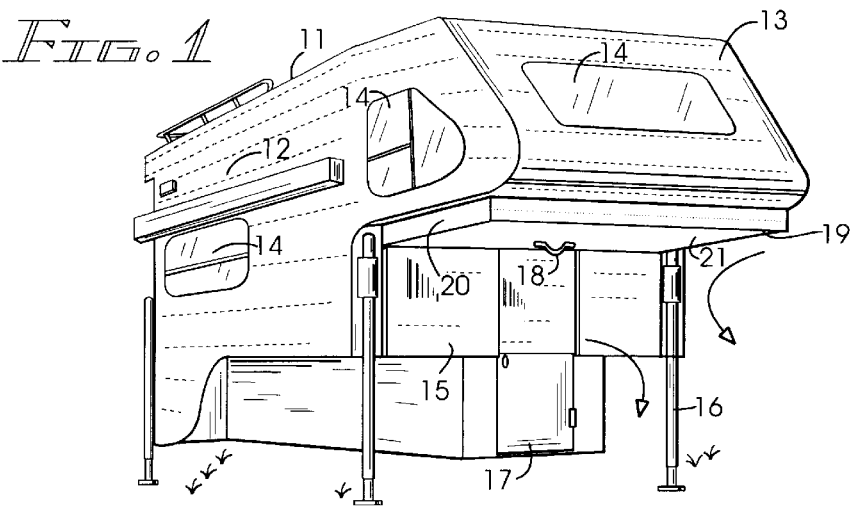
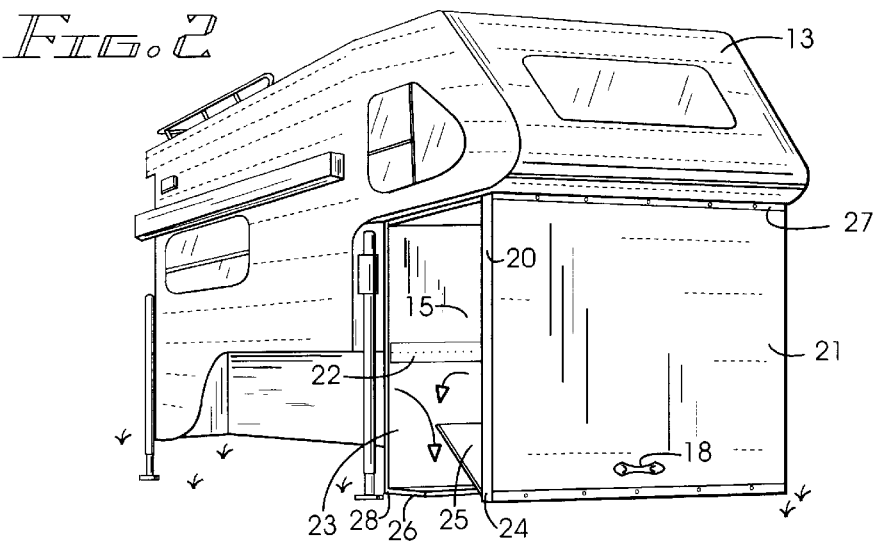
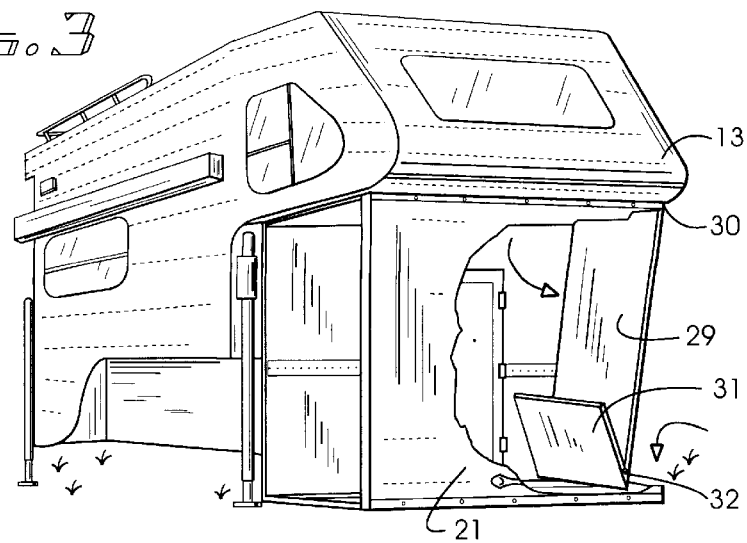

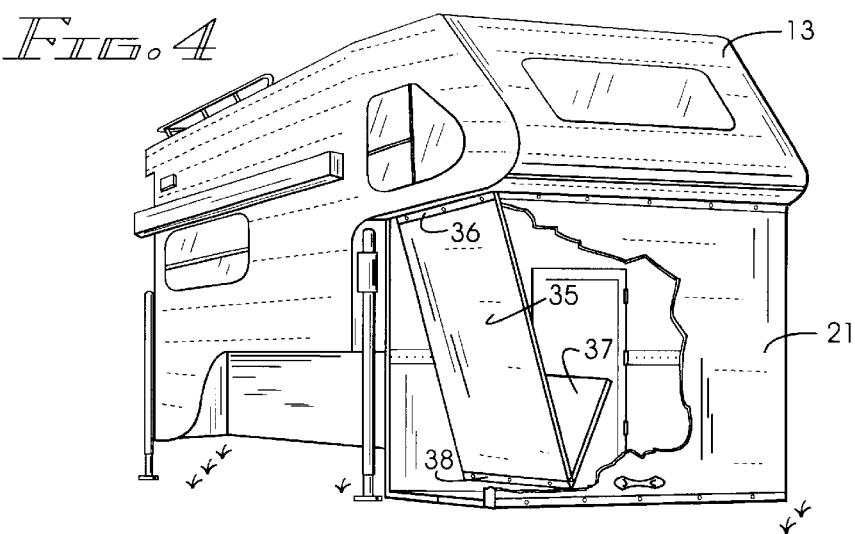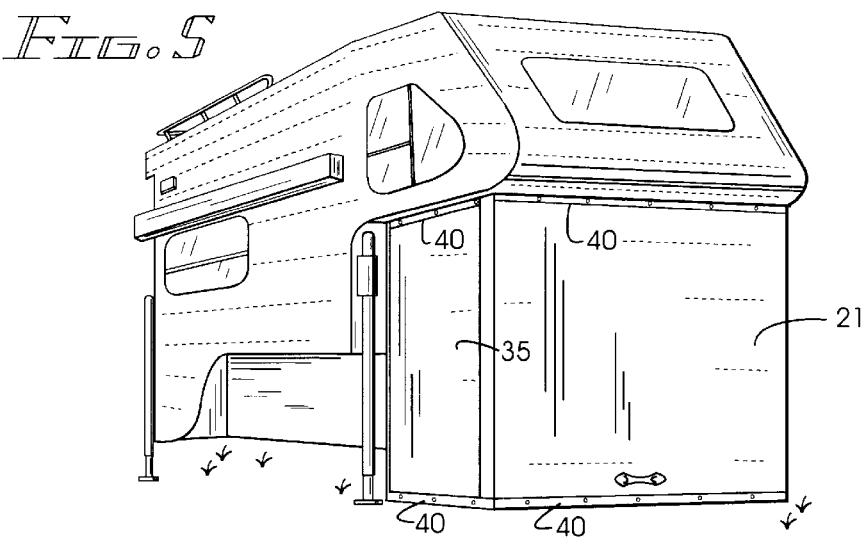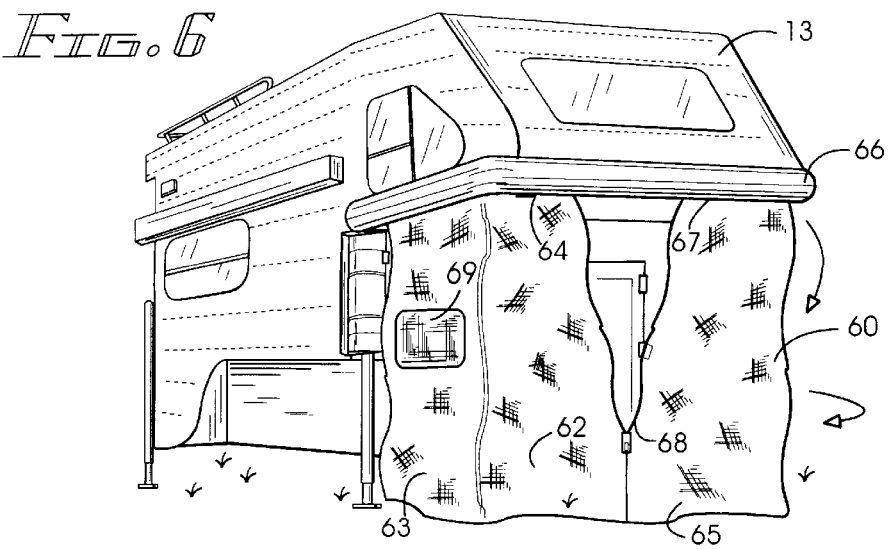

ically shortened front wall 15, with the forward wall forming section 21, further having along its lower edge at 24 a hingedly connected rigid floor forming

COLLAPSIBLE ROOM ADDITION FOR A CAMPER

BACKGROUND OF THE INVENTION

This invention relates to the field of portable campers and camper trailers. More particularly, this invention relates to an improved camper having a collapsible room addition located on the front of the camper underneath the nose or overhanging portion of the camper for use when the camper is supported by jacks on the ground.

Apparatuses for providing collapsible rooms to campers have been described in the prior art. For example, Cutsinger, in U.S. Pat. No. 3,511,529, describes a room addition for attachment to portable campers and trailers which was completely collapsible so as to facilitate convenient storage and travel. However, it is mounted on the back of the camper and used a framework assembly to support curtains which served as the roof and sides of the room. In U.S. Pat. No. 4,222,604, Human, describes a transportable housing structure comprising a cabin unit having access openings and, like Cutsinger, is attached to the rear of a trailer. Blair, in U.S. Pat. No. 4,127,299, describes a mobile camper arrangement wherein two camper bodies of different shapes were mounted on the same towable trailer. This apparatus is dissimilar to the present invention since it is a combination of two non-collapsible units. In U.S. Pat. No. 4,085,959, Dimick describes a travel trailer for fifth wheel towing with a vertically foreshortened forward section configured for extending over a towing vehicle having folding side walls and a front wall which opened to extend over the front section providing full height throughout the trailer. However, it utilizes a complicated network of winches and cables to raise and lower the walls and floor which would unnecessarily increase the costs of such a structure and the difficulty of use.

Notwithstanding the teachings of the related art, there remains a need for the unique and novel features of the present invention. Furthermore, the present invention provides numerous improvements over the deficiencies found in the related art.

SUMMARY OF THE INVENTION

The present invention provides a unique way to obtain more living space from a conventionally designed camper which is generally mounted on the back of a pickup truck. It is common for such campers to have a nose or overhanging section of the cabin which section is located over the cab of the pickup truck when the camper is mounted on the pickup truck. The nose section is constructed in a portion of the camper which is forward of the vertically shortened front wall of the camper, in an area which in a conventional camper is usable only for a sleeping area and therefore is partially wasted. However, the present invention provides a unique way to utilize this space or void below the nose which would otherwise be of no use.

The present invention provides a foldably mounted front wall, interior wall, two side walls, and floor members that when unfolded into their usable positions provide a fully enclosed, weathertight, collapsible room addition for the camper. The room which is provided is secure, watertight and accessible from the interior area of the main cabin of the camper.

Therefore, as can be seen, it is an object of the present invention to provide a means to provide more livable space in a camper. Further, it is an object to create and utilize space in the camper which would otherwise have no use. Finally, it is an objective of the present invention to provide a secure, private, weathertight collapsible room addition for a camper by taking advantage of a void of space which has resulted from conventional camper designs.

BRIEF DESCRIPTION OF THE DRAWINGS

For a fuller understanding of the nature of the present invention, reference should be made to the following detailed description taken in conjunction with the accompanying drawings in which:

FIG. 1 is a perspective view of the present invention shown in the folded position in operative connection with a camper;

FIG. 2 is a perspective view of one embodiment of the present invention disclosing the forward wall and other details;

FIG. 3 is a perspective view of one embodiment of the present invention showing the forward wall partially broken away to disclose details of the construction;

FIG. 4 is a perspective view of one embodiment of the present invention showing the forward wall partially broken away to disclose details of the construction;

FIG. 5 is a perspective view of one embodiment of the present invention shown in the unfolded position in operative connection with a camper;

FIG. 6 is a perspective view of an alternative embodiment of the present invention, shown in an unfolded deployed mode, wherein the forward wall, side walls and floor are formed of a flexible tent-like material.

Like reference numerals refer to like parts throughout the several views of the drawings.

DETAILED DESCRIPTION OF THE PREFERRED EMBODIMENT(S)

Turning to FIG. 1, therein is shown a camper body or cabin unit generally at 11, having a nose or overhanging section 13, a near side wall 12, and a far side wall (not shown), a vertically shortened front wall 15, which front wall is open at a central portion to accommodate passage through a doorway, a roof (not shown), a rear wall (not shown), with the rear wall having a main doorway therein (not shown) through which occupants may enter and leave the cabin. Also, the cabin is equipped with several windows 14 for ventilation and visibility to the outside from inside the cabin, and is mounted on four retractably mounted jacklegs 16, which support the camper and contact the ground while the camper is removed from a pickup truck. Also shown in the front wall 15 is a front door 17 for entering into the collapsible room addition from the main cabin of the camper. Horizontally attached underneath the nose or overhanging section is a folding compartment 19 having a handle 18 thereon, housing the collapsible wall sections of the present invention. FIG. 1 illustrates the components of the present invention 19 shown in the folded, non-use position being a relative horizontal position located under the nose section 13. Items 20 and 21 will be described along with FIG. 2 as follows.

FIG. 2 shows the rigid forward wall forming section of the present invention 21 being hingedly connected at 27 to and extending downward from the bottom side of the nose section 13, along with a rigid interior wall forming section 23, being hingedly connected at 22, to and extending downward from the vertically shortened front wall 15, with the forward wall forming section 21, further having along its lower edge at 24 a hingedly connected rigid floor forming section 25 for folding downwardly. The interior wall forming section 23 has along its lower edge at 28 a hingedly connected rigid floor forming section 26 for folding downwardly. The forward wall section 21 is hingeably mounted by hinging means at 27. Furthermore, a handle is shown at 18. As can be seen from FIGS. 1 and 2, the front wall forming panel 21 serves as a cover for the other panel members of the collapsible room when the other members are in the folded or non-use position as shown in FIG. 1. As seen in FIG. 1, the front wall forming panel 21 includes a peripheral flange or extended side edge 20 perpendicular to the front wall forming panel extending along and around its opposite sides which forms the folding or compartment 19 for containing the other panel members of the collapsible room when the other members are in the folded or non-use position.

Turning to FIG. 3, therein is shown the front folding wall 21 cut away so that one rigid far side wall forming panel 29 is shown along with its rigid hingedly mounted floor forming section 31 which is hingedly mounted at 32 to the bottom edge of the far side forming section 29. Note that the far side forming wall is hingedly mounted at its upper edge 30 to the bottom of the nose section 13.

Turning to FIG. 4, therein is shown the front forming wall 21, cutaway to show the rigid near side wall forming section 35 along with the rigid folding near floor forming section 37. Note that the near side wall forming panel 35 is hingedly mounted at its upper edge 36, to the bottom of the nose section 13, and that the near floor forming section 37 is hingedly mounted at 38 to the bottom edge of the near side wall forming panel.

In FIG. 5, therein is shown the unfolded room wherein the front 21 and near side 35 panels, as previously described, are shown in the unfolded or in-use position. Fastening means 40, such as velcro or wing nut and bolt fasteners, for securing the various wall and floor members together so as to form a strong, snug tight fit between and among the members are shown around the edges of the members.

In an alternative embodiment, the floor or bottom wall of the nose section 13 may be structured and disposed to fold down and outwardly to thereby define the front wall 21. This would serve to open the bottom of the nose section so as to provide a full height room from the floor panels 25, 26 up to the ceiling of the nose section.

In FIG. 6, therein is shown an alternative embodiment of the collapsible room addition 60, constructed of flexible fabric material 62, e.g., ballistic nylon, or other like material suitable for tents or the like. Shown therein are a near side half 63 and far side half 65 being two curtain halves of sufficient size, i.e., width, to extend around the perimeter of the room addition, having spaced fastening means 67 along their upper edge or side thereof slidably mounted on a track or otherwise secured to the lower, outer edge 64 of the nose section 13. Further, the two curtain halves 63 and 65 are joined in their middle by fastening means 68 such as zipper or velcro means. Near side and far side (not shown) windows 69 are provided in the curtain halves. When not in use, the curtain halves are stored in a storage means 66, located along the lower, outer edge of the nose section 13. When in a stowed position, the fabric can be rolled and folded up for storage in the storage means 66. The curtains reach to ground level and have a floor member therein (not shown).

It should be understood that the teachings of this specification and drawings with reference to particular components, alignments, relationships and the like, are given by way of illustration and explanation thereof and not by way of limitation, and that departures from the instant disclosure may be made within the scope and spirit of the invention as set forth in the following claims and within the doctrine of equivalents.

Now that the invention has been described,

What is claimed is:

1. A combination of a collapsible room addition and a camper having a cabin being of sufficient size for occupancy by humans, the cabin including a roof and oppositely disposed walls on each side for supporting the roof, a rear wall located between the sides of the cabin for further supporting the roof, a vertically shortened forward wall, a nose section situated above and forward of the vertically shortened forward wall whereby accommodation is provided for the cab of a pickup truck, and a front door provided in the vertically shortened forward wall for occupants to access the cabin interior;

said collapsible room addition comprising:
 a rigid forward wall forming panel being hingedly mounted to an underside of said nose section;
 a near side rigid wall forming panel being hingedly mounted to the underside of said nose section;
 a far side rigid wall forming panel being hingedly mounted to the underside of said nose section;
 a rigid floor forming panel being hingedly mounted on said rigid forward wall forming panel;
 a rigid floor forming panel being hingedly mounted on said near rigid wall forming panel;
 a rigid floor forming panel being hingedly mounted on said far rigid wall forming panel;
 a rigid interior wall forming panel being hingedly mounted to said vertically shortened wall;
 a rigid floor forming panel being hingedly mounted on said rigid interior wall forming panel; and
 fastening means being provided between said panels whereby said panels are secured one to another.

2. The combination of claim 1 wherein said rigid forward wall forming panel further comprises a peripheral flange perpendicular to said wall forming panel extending around its outer edge whereby a storage chamber is formed for the other panel members when said wall forming panel is in its folded position.

\* \* \* \* \*